(12) United States Patent
Dunnihoo

(10) Patent No.: US 6,185,641 B1
(45) Date of Patent: Feb. 6, 2001

(54) DYNAMICALLY ALLOCATING SPACE IN RAM SHARED BETWEEN MULTIPLE USB ENDPOINTS AND USB HOST

(75) Inventor: Jeffrey Clay Dunnihoo, Austin, TX (US)

(73) Assignee: Standard Microsystems Corp., Hauppauge, NY (US)

( * ) Notice: Under 35 U.S.C. 154(b), the term of this patent shall be extended for 0 days.

(21) Appl. No.: 08/846,882

(22) Filed: May 1, 1997

(51) Int. Cl.[7] .................................................... G06F 13/14
(52) U.S. Cl. ........................... 710/56; 710/112; 710/129; 370/402
(58) Field of Search .............................. 710/56, 112, 129; 370/402

(56) References Cited

U.S. PATENT DOCUMENTS

| | | | |
|---|---|---|---|
| 5,214,760 | * | 5/1993 | Hammond et al. . |
| 5,313,582 | | 5/1994 | Hendel et al. ........................ 395/250 |
| 5,416,909 | * | 5/1995 | Long et al. ............................. 710/36 |
| 5,602,995 | | 2/1997 | Hendel et al. ........................ 395/250 |
| 5,604,916 | * | 2/1997 | Kim et al. ................................ 710/2 |
| 5,764,929 | * | 6/1998 | Kelley et al. ......................... 710/107 |
| 5,802,055 | * | 9/1998 | Krein et al. ........................... 370/402 |
| 5,805,931 | * | 9/1998 | Morzano et al. ...................... 710/64 |
| 5,923,660 | * | 7/1999 | Shemla et al. ....................... 370/402 |

OTHER PUBLICATIONS

John Millios et al., USB, A Peripheral Point of View.
Intel 82930A Universal Serial Bus Microcontroller.
USB Synthesizable Function Core Solutions, CAE Technology, Inc.
USB Device Controller Synthesizable Core, Sand Microelectronics, Inc.
Cypress Preliminary CY763000/CY76601, CY763200/CY766201.

* cited by examiner

Primary Examiner—Thomas C. Lee
Assistant Examiner—Abdelmoniem Elamin
(74) Attorney, Agent, or Firm—Proskauer Rose LLP

(57) ABSTRACT

The present invention relates to a peripheral microcontroller for providing a high performance USB (Universal Serial Bus) connection to existing peripheral architectures (such as printers and disk drives with existing microcontrollers) and to new peripheral architectures (such as a 4-port USB-to-Ethernet Bridge). The USB peripheral microcontroller includes three units. A Serial Interface Engine (SIE) connects to a USB host or USB hub. A Microcontroller (MCU) Interface Unit connects to one or more peripheral devices such as ISA-like peripherals. A Memory Management Unit (MMU) provides a buffering mechanism between the SIE and MCU Interface Unit. The MMU utilizes a unique data packet buffering architecture. Packets received at the MMU from a peripheral for transmission to the USB host and packets received at the MMU from the USB host for transmission to a peripheral are buffered in a RAM. The capacity of the RAM is dynamically allocatable among various USB endpoints and the USB host so that the size of the RAM is minimized. The data path of the inventive USB peripheral controller is also highly advantageous. The SIE accesses the packet buffer RAM via a DMA controller in the MMU. The MCU Interface Unit accesses the packet buffer RAM via a microcontroller or a DMA controller. An arbiter in the MMU enables these multiple masters to access the packet buffer RAM.

25 Claims, 4 Drawing Sheets

DYNAMICALLY ALLOCATING SPACE IN RAM SHARED BETWEEN MULTIPLE USB ENDPOINTS AND USB HOST

FIELD OF THE INVENTION

The present invention relates to a peripheral microcontroller for providing a high performance USB (Universal Serial Bus) connection to existing peripheral architectures (such as printers and disk drives with existing microcontrollers) and to new peripheral architectures (such as a 4-port USB-to-Ethernet Bridge).

The USB peripheral microcontroller includes three units. A Serial Interface Engine (SIE) connects to a USB host or USB hub. A Microcontroller (MCU) Interface Unit connects to one or more peripheral devices such as ISA-like peripherals. A Memory Management Unit (MMU) provides a buffering mechanism between the SIE and MCU Interface Unit.

The MMU utilizes a unique data packet buffering architecture. Packets received at the MMU from a peripheral for transmission to the USB host and packets received at the MMU from the USB host for transmission to a peripheral are buffered in a RAM. The capacity of the RAM is dynamically allocatable among various USB endpoints and the USB host so that the size of the RAM is minimized.

The data path of the inventive USB peripheral controller is also highly advantageous. The SIE accesses the packet buffer RAM via a DMA controller in the MMU. The MCU Interface Unit accesses the packet buffer RAM via a microcontroller or a DMA controller. An arbiter in the MMU enables these multiple masters to access the packet buffer RAM.

BACKGROUND OF THE INVENTION

The USB (Universal Serial Bus) is a peripheral bus specification developed by PC and telecom industry leaders. The USB brings the plug-and-play capability of computer peripherals outside the PC box. This eliminates the need to install cards into dedicated computer slots and reconfigure the system each time a peripheral is attached or detached from a PC. Personal computers equipped with USB allow computer peripherals to be automatically configured as soon as they are physically attached without the need to reboot or run setup. USB allows multiple devices—up to 127—to run simultaneously on a computer, with peripherals such as monitors and key boards acting as additional plug-in sites or hubs.

The USB is described in detail in the Universal Serial Bus Specification, Revision 1.0 published Jul. 15, 1996. The specification is jointly published by Compaq, Digital Equipment Corporation, IBM PC Company, Intel, Microsoft, NEC and Northern Telecom. The contents of this USB specification are incorporated herein by reference.

The USB bus topology may be described as follows. The USB connects USB devices with a USB host. There are two types of USB devices: the hub and the function. A hub is a device which provides additional attachment points for the USB. A function provides capabilities to the system, e.g., an ISDN connection, a digital joystick, a speaker, a keyboard, a mouse, etc. The hub and the function are described in greater detail below.

The USB physical interconnect is a tiered star topology. A hub is at the center of each star. Each wire segment is a point-to-point connection: (a) between the host and a hub, or (b) between a host and a function, or (c) between a hub and another hub or function.

FIG. 1 illustrates the topology of the USB system. The USB system 10 comprises a host 12. There are two points of attachment in the host 12: port 1 and port 2. The port 2 is connected by the wire segment 28 to the function 29. The port 1 is connected by the wire segment 18 to hub 1. The hub 1 has five ports 20. The function 22 is connected to one of these ports by the wire segment 24. Similarly, the hub 2 and hub 3 are also connected to ports of hub 1. Various functions (e.g., function 30, 32, etc.) are connected to ports on the hub 2 or the hub 3.

Hubs are a key element in the plug-and-play architecture of USB. Hubs serve to simplify USB connectivity from the user's perspective and provide robustness at low cost and complexity. Hubs are wiring concentrators and enable the multiple attachment characteristics of USB. Attachment points are referred to as ports (see FIG. 1). Each hub converts a single attachment point into multiple attachment points. The architecture supports concatenation of multiple hubs. The upstream port of a hub connects the hub towards the host. Each of the other downstream ports of a hub allows connection to another hub or function. Hubs can detect the attachment and detachment of a USB device at each downstream port and enable the distribution of power to these downstream USB devices. Each downstream port can be individually enabled and configured as either full or low speed. The hub isolates low speed ports from full speed signaling.

A function is a USB device that is able to transmit or receive data or control information over the USB. A function is typically implemented as a separate peripheral device with a cable that plugs into a port on a hub. However, a physical package may implement multiple functions and an embedded hub with a single USB cable. This is known as a compound device. A compound device appears to the host as a hub with one or more permanently attached USB devices. Examples of functions include a printer, a monitor, a mouse, a keyboard, a modem, an audio CD player, a tape player, an ISDN connection, etc.

There is only one host on any USB system. The USB interface to the host computer system is referred to as the host controller. The host controller may be implemented in a combination of hardware, firmware, or software. A root hub is integrated within the host system to provide one or more attachment points.

A device endpoint refers to a uniquely identifiable portion of a USB device (hub or function) that is a source or sink of information in a communication flow between host and USB device. An example of a USB function with more than one endpoint is a Data/Voice modem. There may be one endpoint for voice packets and one endpoint for data packets.

All bus transactions involve the transmission of up to three packets. Each transaction begins when the host controller, on a scheduled basis, sends a USB packet describing the type and direction of transaction, the USB device address, and endpoint number. This packet is referred to as the Token Packet. The USB device that is addressed by the Token Packet selects itself by decoding the appropriate address fields of the Token Packet. In a given transaction, data is transferred either from the host to a device or from a device to the host. The direction of data transfer is specified in the Token Packet. The source of the transaction then sends a data packet indicating whether the transfer was successful.

In general, most peripherals include I/O controllers which are designed to generate transactions for commonly used busses such as ISA, EISA, PCI, and the proprietary NU bus of Apple. It is desirable to adapt these peripherals for use with the highly advantageous USB. To accomplish this, it is desirable to provide a USB microcontroller which can generate familiar bus transactions such as ISA bus transactions from the USB serial protocol stream.

A block diagram of such a USB microcontroller unit is shown in FIG. 2. This microcontroller unit 50 comprises three blocks, a USB Serial Interface Engine (SIE) 60, Microcontroller Interface Unit 70, and a Memory Management Unit (MMU) 80. The SIE 60 connects to a port on a USB hub or on a USB host and serves as an interface to the USB protocol. Specifically, the SIE 60 formats data to be transmitted from the peripheral to the host in accordance with the USB protocol. It reformats data received from the USB host in accordance with the USB protocol into a form that can be buffered in the Memory Management Unit. The Microcontroller Interface Unit 70 interfaces with the I/O controller of the peripheral.

In conventional USB peripheral microcontrollers, the Memory Management Unit includes a plurality of FIFOs for buffering data packets, there being a dedicated FIFO for each USB endpoint.

Prior art USB microcontrollers are the 82930 Universal Serial Bus Microcontroller—available from Intel, USB Function Core—available from CAE, USB Device Controller Synthesizable Core—available from Sand Microelectronics and the CY7C63000/1 and CY7C36200/1 Cypress USB Controller.

A deficiency of these prior art USB microcontrollers is the memory management technique used within the Memory Management Unit. Typically, the MMU unit includes one FIFO buffer for packets received from the USB host and destined for the peripheral, and one FIFO buffer for each USB endpoint contained within the peripheral that can transmit packets to the USB host. All peripherals will have Endpoint 0 for control packets and Endpoint 1 for user packets. Many peripherals such as audio devices with multiple audio channels will have additional USB endpoints.

The use of a dedicated FIFO for packet from each USB endpoint and the use of a dedicated FIFO for packets from the host is very inefficient use of memory, especially as the FIFOs increase in size.

An improved memory management technique is disclosed in U.S. Pat. No. 5,313,586 and in U.S. Pat. No. 5,602,995, both of which are assigned to Standard Microsystems Corporation. These patents disclose a communication controller which is interfaced with a host processor and which includes a control unit for accessing a communication medium. Each data packet to be transmitted or received is assigned a packet number. Packet number assignment is carried out by a Memory Management Unit within the communication controller. The Memory Management Unit dynamically allocates to each assigned packet number one or more pages in a data packet buffer memory for the storage of the corresponding data packet. Upon issuing the assigned packet number, the physical addresses of the allocated pages of data packet buffer memory storage space are generated in a manner transparent to both the host processor and the control unit. Upon completion of each data packet loading operation, the corresponding packet number is stored in a packet number queue maintained for subsequent retrieval in order to generate the physical addresses at which the corresponding data packet has been stored. The contents of the above-identified U.S. patents are incorporated herein by reference.

In view of the foregoing, it is an object of the present invention to provide a USB microcontroller with an improved Memory Management Unit.

In particular, it is an object of the invention to provide a USB microcontroller with a Memory Management Unit that makes more efficient use of memory than the prior art.

More specifically, it is an object of the invention to provide a USB microcontroller dynamically allocates space in RAM to packets to be buffered instead of using a dedicated FIFO for each USB endpoint and a dedicated FIFO for the USB host.

A further disadvantage of the conventional USB microcontrollers is their data path which typically is arranged as follows:

USB→FIFO→MCU Interface Unit→Peripheral

Because of the use of FIFOs to buffer packets in the MMU, it is difficult, if not impossible, to have more than one master in the MCU Interface Unit access the FIFOs.

Accordingly, it is a further object of the invention to provide a USB peripheral microcontroller with an improved data path, in particular, a data path including a packet buffer which can be accessed by more than one master in an MCU Interface Unit.

SUMMARY OF THE INVENTION

In accordance with an illustrative embodiment, the present invention is directed to an improved USB microcontroller. The USB microcontroller includes an SIE, an MCU Interface Unit with two masters, such as a microcontroller and a DMA (Direct Memory Access) controller, and an improved MMU.

The improved MMU unit comprises a RAM (e.g., a single ported RAM) for buffering data packets. The packets may come from a peripheral and be destined for the USB host. Or, the packets may come from the USB host and be destined for a peripheral. There may be more than one USB endpoint associated with the USB microcontroller. Capacity in the RAM is dynamically allocatable to the packets from the various USB endpoints and the packets from the host.

The improved MMU includes an arbiter which makes the single ported buffer RAM appear to be simultaneously available to the MCU Interface Unit, (specifically both a microcontroller and a DMA controller therein) and to the SIE interface via an SIE DMA controller located in the MMU.

The MMU includes a single receive packet queue and a plurality of transmit packet queues. These queues do not store packets (the packets being stored in the single ported RAM). Rather, the queues store numbers or other identifiers for the packets stored in the RAM. The single receive packet queue stores packet numbers for packets received from the USB and addressed to a USB endpoint. Each transmit queue stores packet numbers for packets to be transmitted from the corresponding USB endpoint to the USB host.

The inventive MMU includes a memory manager which allocates space (e.g., pages) to each packet in the RAM and provides a mechanism for converting between packet numbers and the physical addresses in RAM where the corresponding packets are stored. Thus, to access a packet buffered in the RAM, the packet number in the appropriate queue is retrieved to determine the particular address space in RAM to be accessed.

The inventive USB peripheral microcontroller is highly advantageous in comparison to prior art USB peripheral controllers because of its highly efficient use of a packet RAM in the MMU. In particular, in the inventive USB peripheral microcontroller, capacity in the packet buffer RAM is dynamically allocatable between packets from multiple USB endpoints and packets from USB host. This is far more efficient than the prior art which utilizes a dedicated FIFO for each USB endpoint.

Consider for example a USB Data/Fax/Speaker Phone modem. One USB endpoint is configured to receive and transmit Isochronous Speaker Phone Digital Audio (384 byte packets). Another USB endpoint is configured for Digital Modem Data (64 byte packets). If the user is talking on the phone, no data is being sent. If data is being sent, the user is not talking on the phone. A conventional USB microcontroller includes a two packet FIFO for the first endpoint and an additional two packet FIFO for the second endpoint for a total of 384+384+64+64=896 bytes of FIFO. In contrast, the inventive USB microcontroller has a Memory Management Unit which would require only 768 bytes (i.e., two audio packets) of RAM (not FIFO) because the RAM is dynamically allocatable among the endpoints.

The USB microcontroller with improved MMU of the present invention has an improved datapath in comparison to conventional USB microcontrollers. Specifically, the MMU with SIE DMA controller and arbiter makes the following datapaths available (a) SIE→SIE DMA→BUFFER RAM (b) Buffer RAM→MCU Interface Unit DMA controller→Peripheral (c) Buffer RAM→MCU Microcontroller→Peripheral As indicated by these data paths, the arbiter permits multiple masters to access the buffer RAM simultaneously.

The inventive USB peripheral microcontroller may be implemented as a single integrated circuit.

In an alternative embodiment of the invention, the MCU Interface Unit may be omitted. In this case, the USB peripheral microcontroller comprises an SIE, an MMU, and an external interface device for connecting with an external MPU, DSP (Digital Signal Processor), DMA Engine, or other external device. In this case, the MMU has the same architecture as discussed above wherein an arbiter makes a single ported packet buffer RAM appear to be available to both the external device interface and SIE DMA controller. The transmit and receive queues are used to store packet identifiers in the manner discussed above.

DETAILED DESCRIPTION OF THE INVENTION

Figure 1:
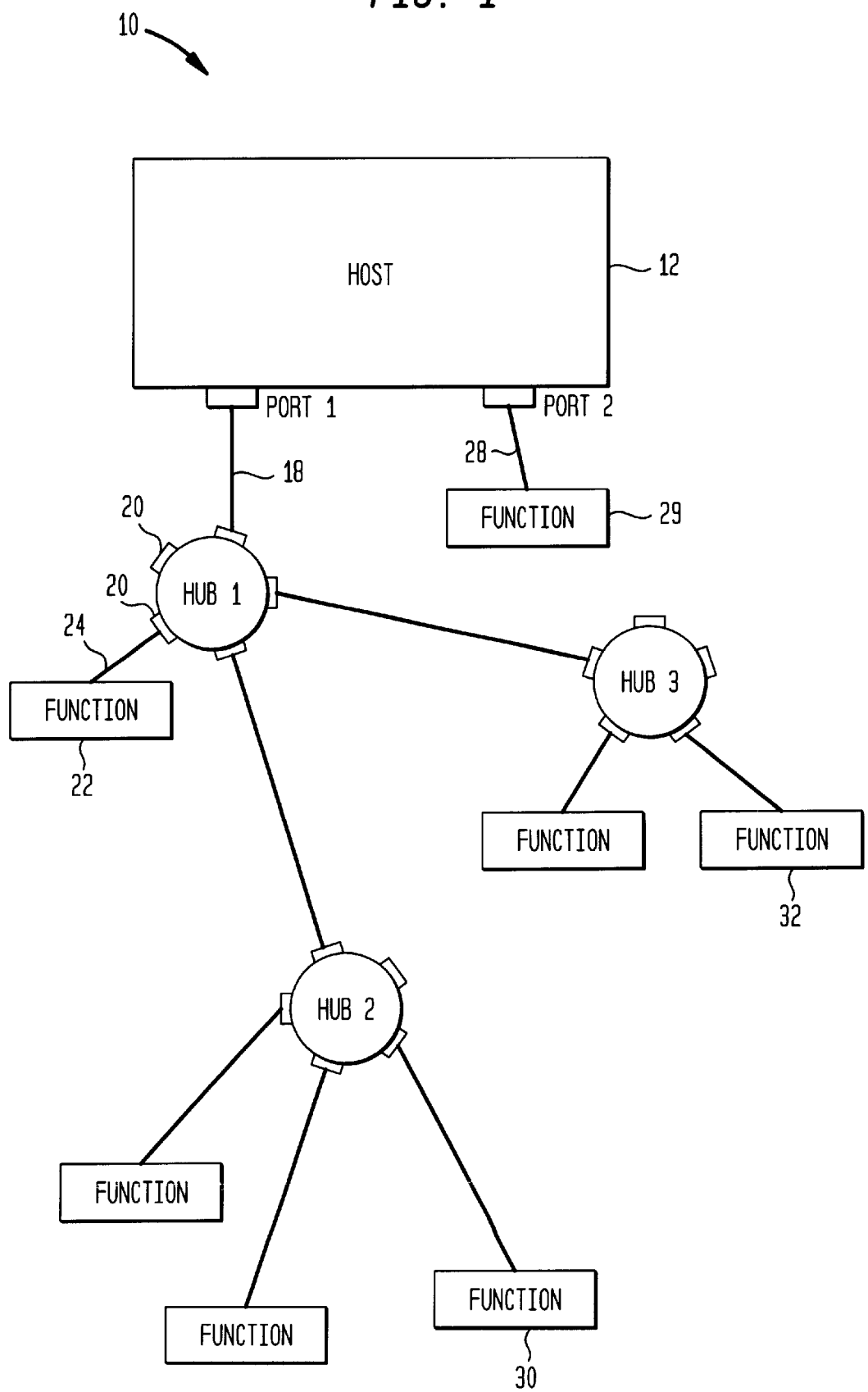
FIG. 1 schematically illustrates a USB system architecture.
Figure 2:
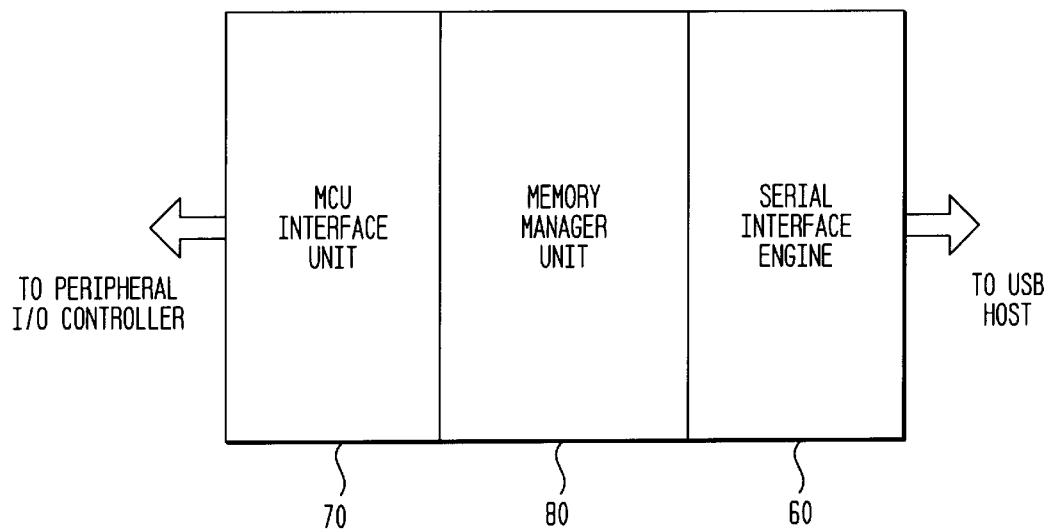
FIG. 2 schematically illustrates a USB peripheral microcontroller.

A USB peripheral microcontroller in accordance with an illustrative embodiment of the present invention is shown in FIG. 1. The USB peripheral microcontroller comprises the Serial Interface Engine (SIE) 60, the MCU Interface Unit 70, and the Memory Manager Unit 80.

The Serial Interface Engine 60 comprises the analog transceiver 62, the SIE function block 64, the SIE DMA interface logic 66, and the endpoint control logic 68. The analog transceiver 62 connects the SIE 60 to a USB differential line 61, which line 61 is in turn connected to a USB host or a USB hub. The specification for this transceiver is in chapter 7 of the USB specification referred to above. The SIE function block translates packets of the serial USB bitstream into parallel data. As is explained below, this parallel data is then buffered in the RAM 82 in the MMU 80. The SIE function block 64 also translates packets retrieved from the buffer RAM 82 in the MMU 70 into USB format serial packets.

The endpoint control logic 68 provides control signals to properly sequence the SIE function block 64 through the USB protocol, for example, for packet generation/reception, PID (Packet ID) verification, CRC checking, etc. The SIE DMA interface logic 66 generates and loads packet identification information (e.g., packet number or other packet header information) into the Rx queue 92 in the MMU 80 via the SIE DMA controller in the MMU 80.

The MCU Interface Unit 70 includes two masters, a microcontroller 72 such as the 8051 and a DMA controller 74 such as the 8237. The masters 72 and 74 are connected to a bus interface engine 76. The bus interface engine is connected to the I/O controller of a peripheral (not shown). Illustratively, both the peripheral I/O controller and Bus Interface Engine generate ISA bus type transactions. In alternative embodiments of the invention, transactions for different bus types, such as EISA, PCI or NU may be utilized.

It should be noted that the 8051 microcontroller can be replaced by any CPU or even a hard coded state machine. The DMA controller 74 is optional and may be omitted. Alternatively, the MCU interface unit may include several different kinds of bus interface engines.

In another case, the USB peripheral microcontroller may interface with the proprietary bus of a super I/O chip.

The Memory Manager Unit 80 comprises the RAM 82. The RAM 82 buffers packets which arrive from the USB host and buffers packets which arrive from the USB peripheral. The capacity of the RAM is dynamically allocatable to these various packets. The Memory Manager Unit 80 also includes an arbiter 84 and an SIE DMA controller 86. The SIE 60 accesses the RAM 82 via the SIE DMA controller 86. The arbiter 84 makes the single ported RAM buffer 82 appear to be simultaneously available to two masters in the MCU Interface Unit 70, i.e., the DMA controller 74 and microcontroller 72, and to the SIE DMA controller 86.

The Memory Manager Unit 80 also includes a plurality of queues 92, 94. The Rx (receive queue) 92 stores a packet number which identifies each packet from USB host which is buffered in the RAM 82.

There are also a plurality of Tx (i.e., transmit) queues 94. There is one transmit queue 94 for each USB endpoint associated with the peripheral device. Each Tx queue 94 stores the packet numbers for the packets from the corresponding USB endpoint which are buffered in the RAM 82. The queues 92, 94 are controlled by a queue control 95 which forms part of the SIE DMA controller 86.

The Memory Manager Unit 86 also includes a memory manager 98 and a MAP RAM 99. The memory manager 98 and MAP RAM 99 together generate a physical address in the packet buffer RAM 82. One such addressing scheme is discussed in detail in the above-identified U.S. Pat. No. 5,313,588. Consider, for example, the case where the RAM 82 is a 4K RAM which comprises 32 pages×128 bytes per page. Each byte location in the RAM has a 12-bit address.

The five MSB (Most Significant Bits) of the address are outputted from the MAP RAM 99 in response to a packet number and a page number within the packet generated by the arbiter 84. The 7 LSB (Least Significant Bits) of the address are a page offset output directly by the arbiter 84.

The operation of the inventive USB peripheral microcontroller with inventive Memory Manager Unit is now considered. Specifically, four transactions are considered. These are (1) receiving a packet from the USB host, (2) sending a packet to the ISA Peripheral, (3) receiving a packet from the ISA Peripheral, and (4) sending a packet to the USB host.

(1) Receiving a Packet from the USB Host

As the SYNC field of a USB packet from the host is detected by the SIE function block 64, the SIE DMA 86 requests a single page allocation in RAM 82 from the arbiter 84. The SIE DMA 86 transfers data from the SIE function block 64 into the RAM 82 and requests the arbiter 84 to allocate more pages as needed. The memory manager 98 generates a packet number for the packet which is stored in the Rx queue 92. (This packet number may be utilized later by the memory manager 98 to generate the address space in the RAM 82 where the packet is stored for subsequent retrieval of the packet.)

(2) Sending a Packet to the ISA Peripheral

A valid packet number (retrieved from the Rx queue 92) and offset is all that is needed for the MCU Interface Unit (DMA controller or microcontroller) to generate the necessary physical address to access any allocated byte in the buffer RAM 82. The access request to the buffer RAM 82 can be made by the DMA controller 74 or microcontroller 72 to the arbiter 84. The retrieved data from the RAM 82 can be written into the address space of the Bus Interface Engine 76 for transfer to the peripheral.

(3) Receiving a Packet from the ISA Peripheral

To load data from the peripheral, the MCU Interface Unit transmits to the arbiter 84 a request for an allocation of new buffer pages in the RAM 82. The MCU Interface Unit can then write data from the Bus Interface Engine into the RAM 82 using packet number and auto generated offsets. The packet numbers are stored in the appropriate Tx queue 94.

(4) Sending a Packet to the USB Host

When the USB host polls a particular USB endpoint, the SIE DMA 86 immediately makes a request to the arbiter 84 for read access to the next packet in the Tx queue 94 for the polled USB endpoint. The packet number from the queue is utilized to generate the physical address for the packet in RAM 82. The corresponding packet is read from the RAM 82 and transferred via the SIE DMA controller 86 to the SIE 60 for transmission to the USB host.

Figure 3:
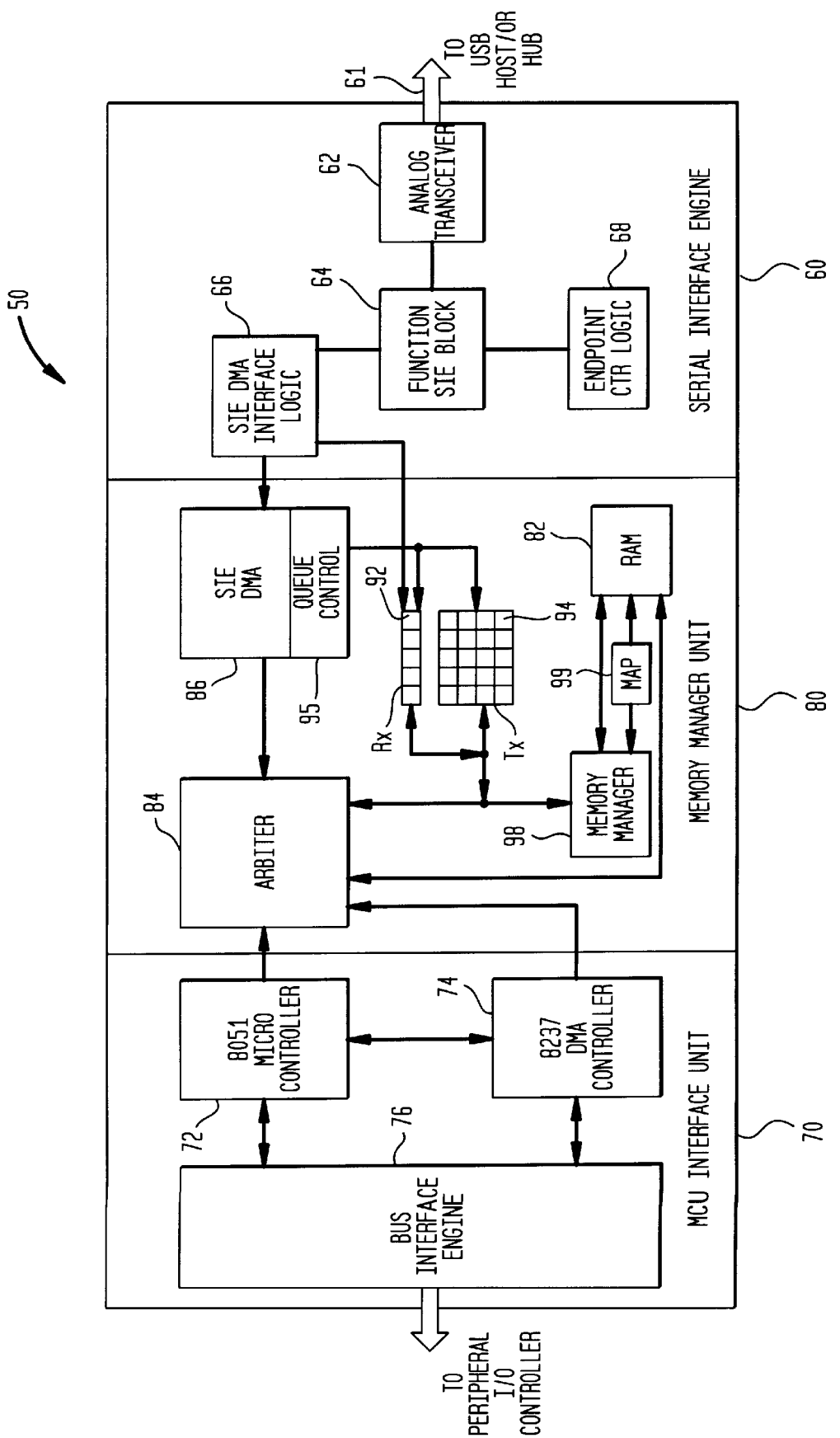
FIG. 3 schematically illustrates a USB peripheral microcontroller in accordance with an illustrative embodiment of the present invention.
Figure 4:
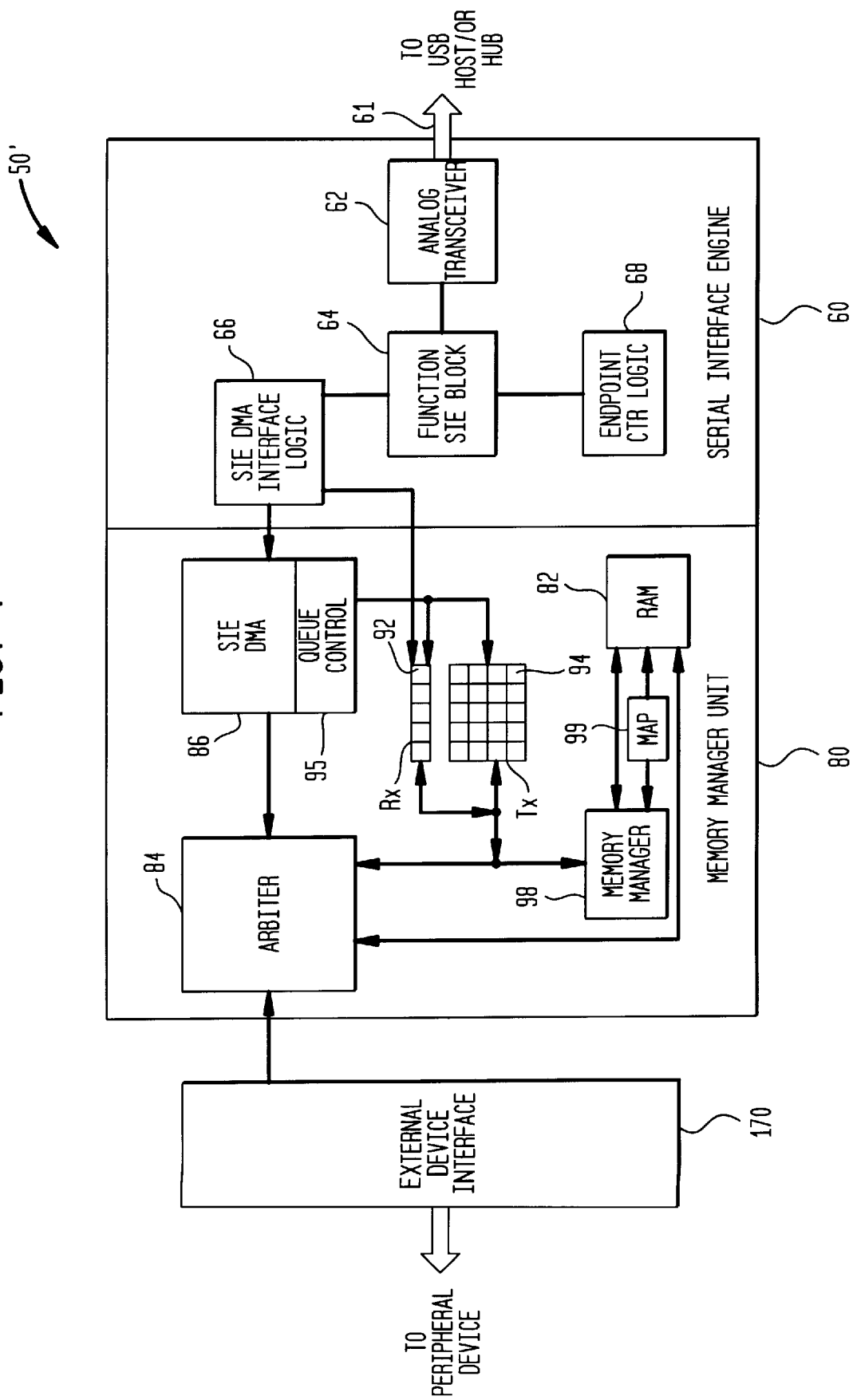
FIG. 4 schematically illustrates a USB peripheral microcontroller in accordance with an alternative illustrative embodiment of the invention.

An alternative embodiment of the invention is shown in FIG. 4. The USB peripheral microcontroller 50' of FIG. 4 comprises an SIE 60 and an MMU 80. The SIE 60 and MMU 80 of FIG. 4 are identical to those shown in FIG. 3. In FIG. 4, the MCU Interface unit 70 is omitted and instead there is an external device interface 170 which is connected to the arbiter 84 in the MMU 80. The external device interface 170 can be connected with an external microcontroller or DSP. This can provide a high performance USB connection to an existing peripheral device which has its own main microcontroller and which has its own proprietary bus structure. Some examples of such existing peripherals are printers and disk drives with existing microcontrollers.

In the USB peripheral microcontroller of FIG. 4, the arbiter 84 makes the single ported packet buffer RAM 82 appear to be simultaneously available to the external device interface 170 and to the SIE DMA controller 86. The RAM 82 then buffers packets which come from the external device connected to the interface 170 and packets which arrive from the USB host via SIE 60.

The Rx queue 92 and Tx queues 94 serve the functions discussed above.

In short, a novel USB peripheral microcontroller has been disclosed. Finally, the above-described embodiments of the invention are intended to be illustrative only. Numerous alternative embodiments may be devised by those skilled in the art without departing from the scope of the claims.

What is claimed is:

1. A USB microcontroller comprising:
   a first interface for interfacing with one of a USB host or USB hub,
   at least one second interface for interfacing with at least one peripheral device so that said peripheral device can be connected to said USB host or USB hub, and
   a single memory management unit connected to both said first and said at least one second interface, said memory management unit comprising a RAM for buffering packets received from said first interface or received from said at least one second interface, wherein said RAM is not limited to buffering said packets in a first-in-first-out (FIFO) paradigm, and an arbiter for dynamically allocating capacity in said RAM to packets received from said first and said at least one second interface.

2. The USB microcontroller of claim 1 wherein said first interface is a Serial Interface Engine (SIE).

3. The USB microcontroller of claim 1 wherein said memory management unit includes a first DMA controller for providing a data path between said first interface and said RAM.

4. The USB microcontroller of claim 3 wherein said second interface comprises a microcontroller and a second DMA controller and wherein said arbiter arbitrates access of said first DMA controller, said second DMA controller and said microcontroller to said RAM.

5. The USB microcontroller of claim 4 wherein said second interface includes a bus interface for connecting to an I/O controller of said peripheral.

6. The USB microcontroller of claim 5 wherein said bus interface is an ISA bus interface.

7. The USB microcontroller of claim 5 wherein said bus interface is an EISA bus interface.

8. The USB microcontroller of claim 5 wherein said bus interface is a PCI bus interface.

9. The USB microcontroller of claim 5 wherein said bus interface is an NU bus interface.

10. The USB microcontroller of claim 1 wherein said memory management unit includes a receive packet buffer for storing packet identifiers corresponding to packets received from said USB host and buffered in said RAM.

11. The USB microcontroller of claim 10 wherein said memory management unit includes a transmit packet buffer corresponding to each USB endpoint associated with said peripheral device, each of said transmit packet buffers storing packet identifiers for packets buffered in said RAM and associated with the corresponding USB endpoint.

12. The memory management unit of claim 11 wherein said memory management unit includes a circuit for converting between said packet identifiers and a corresponding physical address space in said RAM.

13. The USB microcontroller of claim 1, wherein said first interface and said at least one second interface is capable of requesting an allocation of space of said RAM from said arbiter, such that said arbiter dynamically allocates space to multiple requesting interfaces simultaneously.

14. A USB microcontroller comprising:
a first interface for interfacing with one of a USB host or USB hub,
at least one second interface for interfacing with at least one peripheral device so that said peripheral device can be connected to said USB, and
a memory management unit for use in a USB peripheral controller comprising a single RAM whose address space is dynamically allocatable between packets associated with a plurality of USB endpoints and packets associated with said USB host, and whose buffering is not limited to a first-in-first-out (FIFO) paradigm.

15. The USB microcontroller of claim 14 further comprising a receive buffer for storing identifiers of said packets associated with said USB host.

16. The USB microcontroller of claim 14 further comprising a transmit buffer corresponding to each of said USB endpoints for storing identifiers of said packets associated with the corresponding USB endpoints.

17. The USB microcontroller of claim 14 further comprising an arbiter which controls allocation of said address space in said RAM to said packets.

18. The USB microcontroller of claim 17 further including a first DMA controller for enabling a USB Serial Interface Engine to access said RAM.

19. The USB microcontroller of claim 18 wherein said arbiter enables a microcontroller and a second DMA controller to access said RAM.

20. A USB microcontroller comprising:
a first interface for interfacing with one of USB host or USB hub,
a second interface for interfacing with at least one peripheral device and comprising first and second masters,
a memory management unit connected to both said first and second interfaces, said memory management unit comprising a single RAM whose address space is dynamically allocated to packets directly received by the first and second interfaces, where the packets are associated with both a plurality of USB endpoints and said USB host, wherein said RAM is not limited to buffering said packets in a first-in-first-out (FIFO) paradigm, and an arbiter for enabling said first and second masters and a master associated with said first interface to access said RAM.

21. A memory management unit for a USB peripheral controller comprising a single RAM whose address space is dynamically allocatable between packets directly received from a plurality of USB endpoints and a USB host, a receive queue for queuing identifiers of said packets associated with said USB host, a transmit queue associated with each of said USB endpoints for queuing identifiers of said packets associated with the corresponding USB endpoint.

22. The memory management unit of claim 21, further comprising a circuit for relating each of said packet identifiers to a particular address space in said RAM.

23. The memory management unit of claim 21 wherein said memory management unit is connected to an external device interface and to USB serial input engine.

24. A USB peripheral microcontroller comprising:
a Serial Input Engine for interfacing with one of a USB host or USB hub,
an external device interface for interfacing with at least one peripheral device, and
a memory management unit connected to said Serial Input Engine and said external device interface, said memory management unit comprising a RAM whose address space is dynamically allocated to packets generated at one or more USB endpoints associated with said at least one peripheral device and packets transmitted from said host via said USB hub, and whose buffering is not limited to a first-in-first-out (FIFO) paradigm.

25. A USB microcontroller comprising:
a first interface for interfacing with one of a USB host or USB hub, said first interface being an upstream USB port,
at least one second interface for interfacing with at least one peripheral device so that said peripheral device can be connected to one of said USB host or said USB hub, and
a single memory management unit connected to both said first and said at least one second interface
wherein said USB microcontroller being configured such that one of said at least one peripheral device is capable of transfering information to another of said at least one peripheral device through said USB host or said USB hub.

* * * * *